United States Patent
Pond et al.

(10) Patent No.: US 11,199,616 B1
(45) Date of Patent: Dec. 14, 2021

(54) CONFIGURABLE BEAM FORMER INTEGRATED CIRCUIT AND METHOD

(71) Applicant: Rockwell Collins, Inc., Cedar Rapids, IA (US)

(72) Inventors: Robert D. Pond, Cedar Rapids, IA (US); Michael C. Meholensky, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 347 days.

(21) Appl. No.: 15/983,917

(22) Filed: May 18, 2018

(51) Int. Cl.
*G01S 13/02* (2006.01)
*H01Q 25/04* (2006.01)
*G01S 7/03* (2006.01)

(52) U.S. Cl.
CPC .............. *G01S 13/02* (2013.01); *G01S 7/032* (2013.01); *H01Q 25/04* (2013.01); *G01S 2013/0245* (2013.01)

(58) Field of Classification Search
None
See application file for complete search history.

(56) References Cited

U.S. PATENT DOCUMENTS

| | | | | |
|---|---|---|---|---|
| 10,971,815 B1* | 4/2021 | West | ........................ | H01Q 3/26 |
| 2013/0088381 A1* | 4/2013 | Puzella | ................... | H01Q 25/02 |
| | | | | 342/154 |
| 2017/0090014 A1* | 3/2017 | Subburaj | ............... | G01S 7/4004 |

* cited by examiner

Primary Examiner — Whitney Moore
(74) *Attorney, Agent, or Firm* — Suiter Swantz pc llo

(57) ABSTRACT

Systems and methods relate to a configurable integrated circuit for beamforming. The integrated circuit includes a first beam transmit input, a first beam receive output, a second beam transmit input, a second beam receive output, a first antenna terminal, a second antenna terminal, a first switched combiner, and a second switched combiner. The first switched combiner includes a first combiner input/output coupled to the first antenna terminal, a first combiner output coupled to a first output path having a first branch coupled to the first beam output and a second branch coupled to the second beam output, and a first combiner input coupled a first input path having a third branch coupled to the first beam input and a fourth branch coupled to the second beam input.

20 Claims, 8 Drawing Sheets

CONFIGURABLE BEAM FORMER INTEGRATED CIRCUIT AND METHOD

BACKGROUND

Embodiments of inventive concepts disclosed herein relate generally to an integrated circuit for beam forming and a method of beam forming using an integrated circuit. The integrated circuit can be used with an electronically scanned array (ESA). An ESA is an antenna that can be electronically steered to point in different directions.

Sensing and communication systems often utilize an ESA to provide a variety of functions, such as communication, radar, and sensing functions. For example, a wide band ESA can be used in electronic intelligence (ELINT) sensors, high data rate communication systems, and radar systems to perform functions including but not limited to, communications, sensing, intelligence-gathering (e.g., signals intelligence, or SIGINT), direction finding (DF), electronic countermeasure (ECM) or self-protection (ESP), electronic support (ES), electronic attack (EA) and the like.

An analog beam former (ABF) including an integrated circuit is often used to form beams in response beamforming commands. The integrated circuit for the beam former is designed for the particular platforms and applications. The ESA is used with multiple beams and polarizations. Multiple beams have required multiple integrated circuits packages next to each other and a radio frequency (RF) splitter to feed the ESA for the multiple beams. In addition, passive polarizers are often placed in front of the ABF for polarization. However, such a passive polarizer scheme locks the system to a single polarization or requires a set of polarizers that has to be switched to enable a discrete set of polarizations. Conventional ABFs are generally large, expensive, use a large amount of direct current (DC) power, and have too high of noise for widespread use due to multiple beam and polarization requirements.

SUMMARY

In one aspect, embodiments of the inventive concepts disclosed herein are directed to a configurable integrated circuit for beamforming. The integrated circuit includes a first beam transmit input, a first beam receive output, a second beam transmit input, a second beam receive output, a first antenna terminal, a second antenna terminal, a first combiner, and a second combiner. The first combiner includes a first combiner input/output coupled to the first antenna terminal, a first combiner output coupled to a first output path having a first branch coupled to the first beam output and a second branch coupled to the second beam output, and a first combiner input coupled a first input path having a third branch coupled to the first beam input and a fourth branch coupled to the second beam input. The second combiner includes a second combiner input/output coupled to the second antenna terminal, a second combiner output coupled to a second output path having a fifth branch coupled to the first beam output and a sixth branch coupled to the second beam output, and a second combiner input coupled a second input path having a seventh branch coupled to the first beam input and an eighth branch coupled to the second beam input.

In a further aspect, embodiments of the inventive concepts disclosed herein are directed to a beam former circuit. The beam former circuit includes an integrated circuit including a first beam transmit input, a first beam receive output, a second beam transmit input, a second beam receive output, a first antenna terminal, a second antenna terminal, and a configurable amplifier circuit. The configurable amplifier circuit includes a first input/output selectively coupled to a first variable gain amplifier coupled to the first beam output and a second variable gain amplifier coupled to the second beam output. The first input/output is also selectively coupled to a third variable gain amplifier coupled to the first beam input and a fourth variable gain amplifier coupled to the second beam input. The configurable amplifier circuit further includes a second input/output selectively coupled to a fifth variable gain amplifier coupled to the first beam output and a sixth variable gain amplifier coupled to the second beam output. The second input/output is selectively coupled to a seventh variable gain amplifier coupled to the first beam input and an eighth variable gain amplifier coupled to the second beam input.

In a further aspect, embodiments of the inventive concepts disclosed herein are directed to a method of forming a beam. The method includes configuring an integrated circuit for operation in a satcom mode or a radar mode. The integrated circuit includes a first beam transmit input, a first beam receive output, a second beam transmit input, a second beam receive output, a first antenna terminal, a second antenna terminal, and an amplifier circuit. In the satcom mode, the amplifier circuit provides a first path from the first antenna terminal to the first beam output and a second path from the first antenna terminal to second beam output. In the radar mode, the amplifier circuit provides a third path from the first antenna terminal to the first beam output and a fourth path from the second antenna terminal to the second beam input. The method also includes amplifying a first signal in the first path and a second signal in the second path in the satcom mode or amplifying a third signal in the third path and a fourth signal in the fourth path in the radar mode.

BRIEF DESCRIPTION OF THE FIGURES

Implementations of the inventive concepts disclosed herein may be better understood when consideration is given to the following detailed description thereof. Such description makes reference to the included drawings, which are not necessarily to scale, and in which some features may be exaggerated and some features may be omitted or maybe represented schematically in the interest of clarity. Like reference numerals in the drawings may represent and refer to the same or similar element, feature, or function. In the drawings.

DETAILED DESCRIPTION

Figure 1:
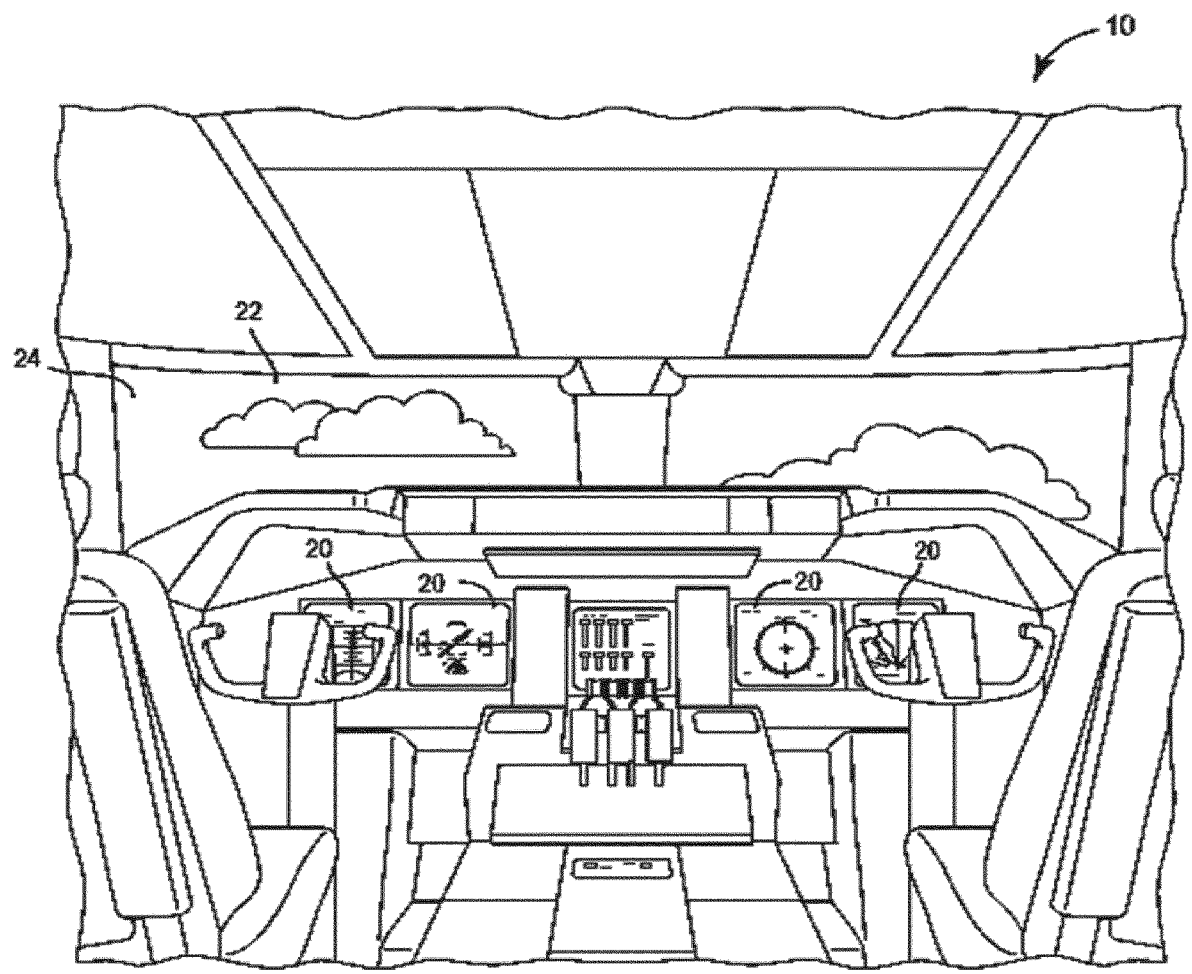
FIG. 1 is a perspective view schematic representation of an aircraft control center for an aircraft including an ESA system, according to some embodiments.

Before describing in detail embodiments of the inventive concepts disclosed herein, it should be observed that the inventive concepts disclosed herein include, but are not limited to a novel structural combination of components and circuits disclosed herein, and not to the particular detailed configurations thereof. Accordingly, the structure, methods, functions, control and arrangement of components and circuits have, for the most part, been illustrated in the drawings by readily understandable representations and schematic diagrams, in order not to obscure the disclosure with structural details which will be readily apparent to those skilled in the art, having the benefit of the description herein. Further, the inventive concepts disclosed herein are not limited to the particular embodiments depicted in the diagrams provided in this disclosure, but should be construed in accordance with the language in the claims.

Referring to the figures generally, the various embodiments disclosed herein relate to an integrated circuit (e.g., analog) for beam forming operations in ESA systems, apparatuses, and methods. The integrated circuit advantageously supports arbitrary polarization synthesis, supports multiple beams necessary to perform make before break operations and/or to increase utilizable beam width, supports multiple frequency bands, and supports linearity adjustments to handle conflicting use case requirement (e.g., radar v. satcom) in embodiments. In some embodiments, the integrated circuit is configurable for multiple applications and system requirements, thereby reducing integrated circuit costs and design costs because the integrated circuit can be utilized on many different platforms and many different applications (e.g., in airborne radar applications, satcom applications, and electronic warfare sensors applications). In some embodiments, the beam former integrated circuit is used in satcom multiple service operations (e.g., low earth orbiting (LEO) and geo stationary orbiting (GEO) satellites).

In some embodiments, the integrated circuit for the ABF is generic for multiple applications. The integrated circuit is operable over a wide frequency range (e.g., L band to 30 Giga Hertz (GHz)) in some embodiments and has 30 dB of adjustable linearity with corresponding equivalent DC power consumption savings in some embodiments. The integrated circuit provides integrated polarization synthesis, has multiple beam outputs and inputs, dynamic gain, and transmit and receive paths integrated together in some embodiments.

Referring to FIG. 1, an illustration of a cockpit or an aircraft control center 10 is shown, according to some embodiments. The aircraft control center 10 includes at least one flight display 20. The pilot may use flight display 20 to increase visual range and to enhance decision-making abilities. In an exemplary embodiment, flight display 20 may be configured to show weather, terrain, fixed obstacles, variable obstacles (e.g., other aircraft), flight characteristics (e.g., altitude or speed), targets, communication information, weapons and ECM information or any combination thereof. The flight display 20 can provide information from an ESA system 102 (FIG. 2).

Figure 2:
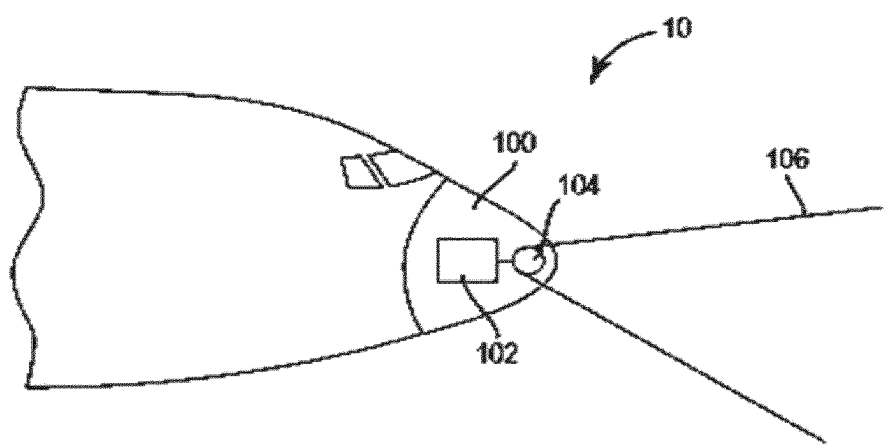
FIG. 2 is a side view schematic representation of an ESA for the aircraft associated with the aircraft control system illustrated in FIG. 1, according to some embodiments.

In FIG. 2, the front of an aircraft is shown with the aircraft control center 10 and a nose 100, according to some embodiments. A communication system, electronic warfare system or radar system, such as the ESA system 102, is generally located inside the nose 100 of the aircraft. According to some embodiments, the ESA system 102 is located at the top of the aircraft or on the tail of the aircraft. In some embodiments, the ESA system 102 is or part of a weather radar system that is adapted to use a multiplexed beam pattern in a radar scan 106, a communication system that receives communications associated with a directional beam, or an electronic warfare system using a beam. While FIGS. 1-2 specifically discuss an aircraft employing the ESA system 102, the systems and method discussed herein can be utilized in any ESA application and can be employed on any stationary or mobile platform.

In some embodiments, the ESA system 102 includes or is coupled to an antenna 104. The antenna 104 is an array antenna including individual, electronically steerable elements in some embodiments. The antenna elements can be printed circuit board antenna elements, metallic channels or surfaces, or other conductive elements. In some embodiments, the antenna elements are balanced antipodal Vivaldi antenna (BAVA) elements. The antenna 104 provide or receive signals at different frequencies or with different coding in some embodiments. The ESA system 102 aims beams from the antenna 104 by emitting or receiving separate radio waves that interfere constructively at certain angles in front of antenna 104. The antenna 104 is steered by using phase shift units, or true time delay units in some embodiments.

Figure 3:
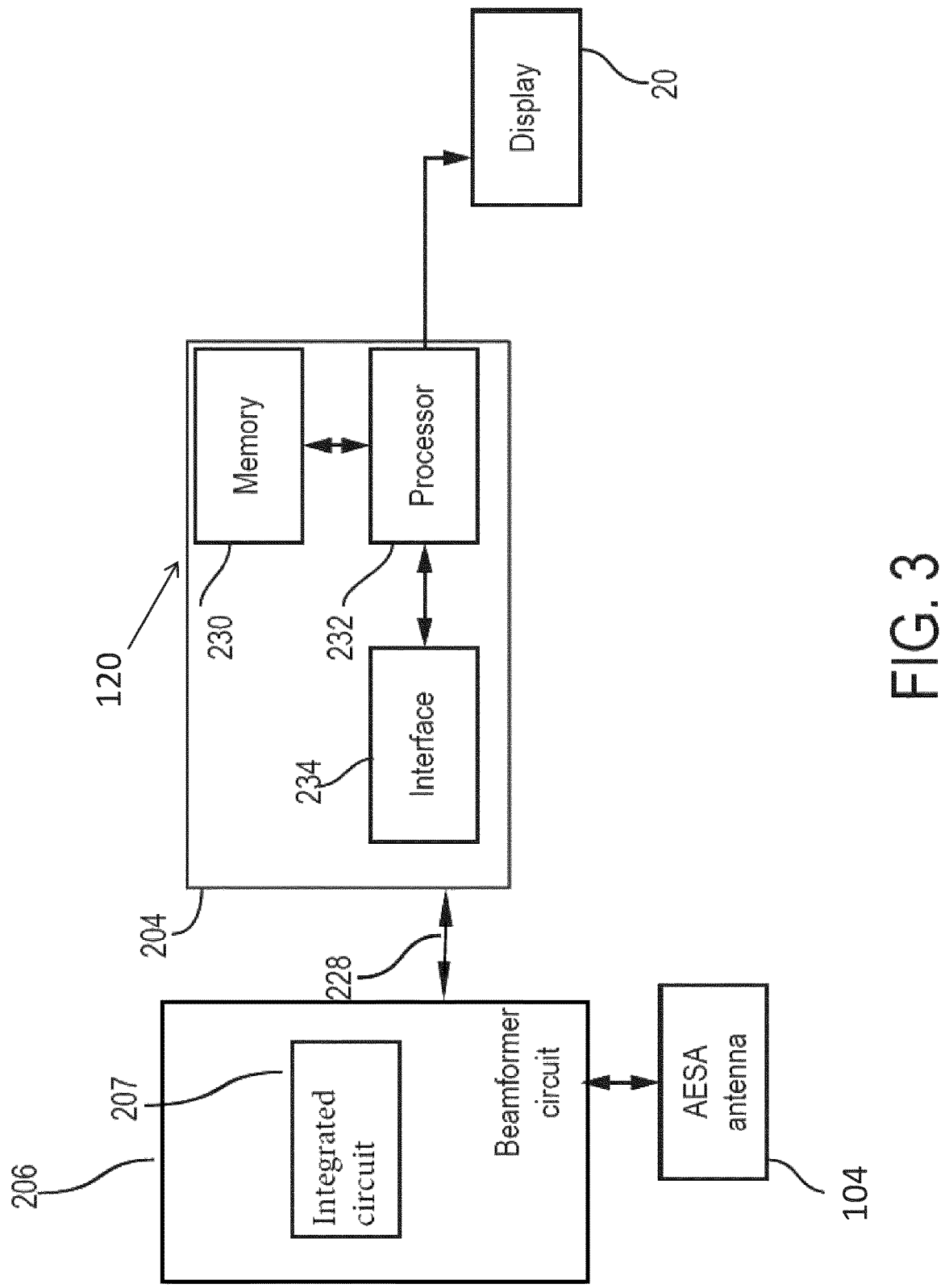
FIG. 3 is a schematic block diagram of the ESA system illustrated in FIG. 2 including a beam former integrated circuit according to some embodiments.

Referring to FIG. 3, an ESA system 102 includes a controller 204, a beam former circuit 206, and the antenna 104. The ESA system 102 is optionally coupled to the display 20 (e.g., through a display computer) in some embodiments. The controller 204 includes a memory 220, a processor 232 and an interface circuit 224. The controller 204 receive signals from the beam former circuit 206 and provide signals to the beam former circuit 206 on a bus or conductors 228 in some embodiments. The controller 204 is configured as master controller for controlling steerable beams (e.g., in azimuth, elevation, and polarity) in some embodiments.

The ESA system 120 operates as a receive only unit, a transmit only unit, or a transmit/receive unit. The beam former circuit 206 provides time delay or phase shifting operations for beam steering operations. The beam former circuit 206 receives radio frequency signals for beam forming operations from the interface circuit 234 in some embodiments. In some embodiments, the beam former circuit 206 includes one or more integrated circuits, such as an integrated circuit 207 (e.g., silicon germanium (SiGe) chips). In some embodiments, the integrated circuit 207 is fabricated using CMOS (e.g., RF CMOS, SOI CMOS) and/or other integrated circuit processes. In some embodiments, the beam former circuit 206 controls the polarity of signals, a time delay, a phase shift, or other aspects required for desirable beamforming in response to signals from the controller 204.

The beam former circuit 206 including one or more of time delay or phase shift circuits, transmit/receive circuits, receiver/exciter circuits, frequency conversion circuits, polarity selection circuits, antenna element addressing circuits, interface circuits, and filters. In some embodiments, the integrated circuit 207 includes configurable paths including amplifiers, splitters, combiners, variable gain amplifiers, and phase shifters or time delays designed to receive signals or data via the antenna 104 (e.g., ESA). In some embodiments, the integrated circuit 207 includes amplifiers, splitters, variable gain amplifiers, combiners, and phase shifters or time delays designed to transmit signals or data via the antenna 104. The integrated circuit 207 is operable over a wide frequency range (e.g., L band to 30 Giga Hertz (GHz)) in some embodiments and has 30 dB of adjustable linearity with corresponding equivalent DC power consumption savings in some embodiments. The integrated circuit 207 provides integrated polarization synthesis, has multiple beam outputs and inputs, dynamic gain, and transmit and receive paths integrated together in some embodiments.

In some embodiments, the processor 232 is a one or more computing platforms for providing modem and baseband operations. The processor 232 communicates through the interface circuit 234 with the beam former circuit 206. In some embodiments, the processor 232 includes a field programmable gate array (FPGA). On some embodiments, the processor 232 includes a microprocessor, digital signal processor, an application specific integrated circuit (ASIC), or another type of control block architecture. In some embodiments, each of the conductors 228 can be configured for serial or parallel bus communications.

The memory 230 provides data storage for the controller 204. In some embodiments, the memory 230 provides a non-transitory medium for storing instructions for processor 232. The instructions provide beam forming commands in response to application requirements in some embodiments. The memory 230 provides can be part of processor 232 or be one or more separate electronic storage devices.

The interface circuit 234 provides interface circuitry for providing radio frequency signals between the processor 232 and the beam former circuit 206. The interface circuit 234 can include busses, multiplexers, modems, frequency conversion circuits, transmit receive circuits, filters, and buffers in some embodiments.

Although the ESA system 102 is discussed above as an avionic radar system, the ESA system 102 can also be a ground-based, space-based, or naval-based radar system. For example, the ESA system 102 can be or include a sense and avoid (S&A) or ground moving target indicator (GMTI) radar, a search and rescue radar, a "brown out" radar, a multimode signal intelligence radar, an electronic warfare radar, a border surveillance radar, a maritime radar, a fire control radar, or a millimeter wave (MMW) imaging and landing radar used in a high data rate system (a system that may provide radar images in real-time video data format), or otherwise. As another example, the ESA system 102 as described may be used in a hybrid frequency modulated continuous wave (FMCW)/pulsed radar system. In some embodiments, the ESA system 120 is configured for communicating with a LEO satellite constellation and a GEO satellite constellation. Parameters associated with the ESA system 102, can vary based on the operating frequencies, beam width, antenna design, and band width supported by the ESA system 102. The specific values and numbers of components in the ESA system 102 described above are exemplary.

Figure 4:
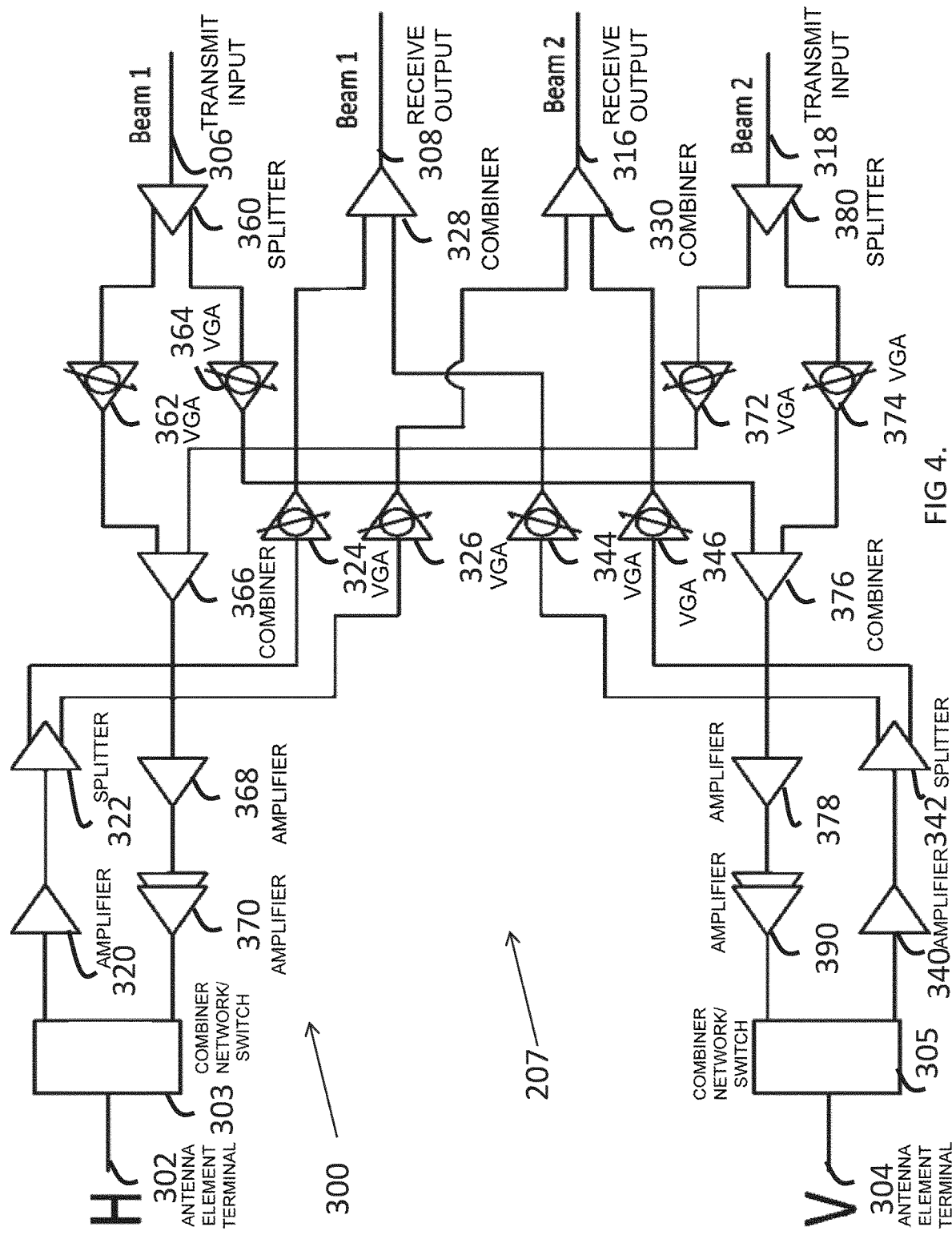
FIG. 4 is a schematic block diagram of a portion of a beam former integrated circuit illustrated in FIG. 3, according to some embodiments according to some embodiments.

With reference to FIG. 4, a portion 300 of the integrated circuit 207 is used for beam forming. The portion 300 is the entire integrated circuit in some embodiments. In some embodiments, the portion 300 is a repeatable part of the integrated circuit (e.g., a quadrant). The portion 300 includes an antenna element terminal 302 (e.g., input/output), an antenna element terminal 304, a beam 1 transmit input 306, a beam 1 receive output 308, a beam 2 receive output 316, and a beam 2 transmit input 318. In some embodiments, the antenna element terminal 304, beam 1 transmit input 306, beam 1 receive output 308, beam 2 receive output 316, and beam 2 transmit input 318 are integrated circuit terminals and are electrically coupled to solder bumps, pins or other connectors for connecting to circuits outside of the integrated 207. In some embodiments, the portion 300 is repeated four times on the integrated circuit 207 to provide four beam 1 inputs, four beam 1 outputs, four beam 2 inputs, four beam 2 outputs, and 8 antenna element terminals.

The portion 300 includes a signal processing or amplification circuit including a combiner network 303, a combiner network 305, a low noise amplifier (LNA) 320, a splitter 322, a variable gain amplifier (VGA) 324, a VGA 326, a combiner 328, and a combiner 330. The combiners 328 and 330 are coupled to the beam1 receive output 308 and beam 2 receive output 316, respectively, and the combiner network 303 is coupled to the antenna element terminal 302. The portion 300 includes a receive path between the amplifier 320 and the combiners 328 and 330. The receive path includes a first branch from the splitter 322 through the VGA 324 to the combiner 328 and a second branch from the splitter 322 through the VGA 326 to the combiner 330. The branches are selectable in some embodiments.

The signal processing or amplification circuit also includes a splitter 360, a splitter 342, a VGA 344, and a VGA 346. The combiner network 305 is coupled to the antenna element terminal 304. The portion 300 includes a receive path between the amplifier 340 and the combiners 328 and 330. The receive path includes a first branch from the splitter 342 through the VGA 344 to the combiner 328 and a second branch from the splitter 342 through the VGA 346 to the combiner 330. The branches are selectable in some embodiments.

The signal processing or amplification circuit also includes a splitter 360, a VGA 362, a VGA 364, a combiner 366, an amplifier 368, a power amplifier 370, a splitter 380, a VGA 372, a VGA 374, a combiner 376, an amplifier 378, and a power amplifier 390. The splitters 360 and 380 are coupled to the beam1 transmit input 306 and beam 2 transmit input 318, respectively. The portion 300 includes a transmit path between the splitter 360 and the combiner networks 303 and 305. The transmit path includes a first branch from the splitter 360 through the VGA 362 through the combiner 366 to the amplifiers 368 and 370 and a second branch from the splitter 360 through the VGA 364 through the combiner 376 to the amplifiers 378 and 390. The branches are selectable in some embodiments.

The portion 300 also includes a transmit path between the splitter 380 and the combiner networks 303 and 305. The transmit path includes a first branch from the splitter 380 through the VGA 372 through the combiner 366 to the amplifiers 368 and 370 and a second branch from the splitter 360 through the VGA 364 through the combiner 376 to the amplifiers 378 and 390. The branches are selectable in some embodiments.

The signal processing and amplification circuit includes a minimal number of components to support the operations described herein in some embodiments. The portion 300 is configurable via switches, memory, or fuses to select appropriate paths for particular applications in some embodiments. In some embodiments, components (e.g., active components, such as amplifiers, active splitters/combiners) that are not in a selected path selected do not use power.

The combiner networks 303 and 305 are switched combiner networks in some embodiments. In some embodiments, the combiner networks 303 and 305 are two solder bumps for connection to antenna elements. The antenna elements are transmit element connected to the combiner network 305 and a receive element connected to the combiner network 303 in some embodiments. The antenna elements are a vertical polarization element connected to the combiner network 305 and a horizontal polarization element connected to the combiner network 303 in some embodiments. The portion 300 can synthesis linear or circular polarization. The portion 300 is capable of supporting two independent beams (e.g., horizontal and vertical polarization and receive and transmit). The polarization synthesis capability of the portion 300 allows for synthesis of arbitrary polarizations, but also allows for the blocking of other polarization which can be particularly important when polarization diversity is used to increase throughput or creating jamming resistant AESAs in some embodiments.

The amplifiers 368 and 378 are buffer amplifiers in some embodiments. The splitters 322, 342, 360, and 380 are active splitters in some embodiments. The combiners 328, 330, 366, and 376 are active combiners in some embodiments. In some embodiments, the splitters 322, 342, 360, and 380 and the combiners 328, 330, 366, and 376 have selectable inputs and outputs so that signal paths can be chosen through the portion 300 The VGAs 324, 326, 344, 346, 362, 364, 372, and 374 are active amplitude adjusting and phase shifting components in some embodiments.

The VGAs 324, 326, 344, 346, 362, 364, 372, and 374 receive control signals for effecting the proper amount of phase shift and amplitude adjustment in some embodiments. In some embodiments, a control bus associated with the conductors 228 for receiving the beam control commands (e.g., beam steering commands) is connected to the integrated circuit 207. In some embodiments, the portion 300 provides phase adjustments and gain control for each beam independently using the VGAs 324, 326, 344, 346, 362, 364, 372, and 374 in the selected paths.

Figure 5:
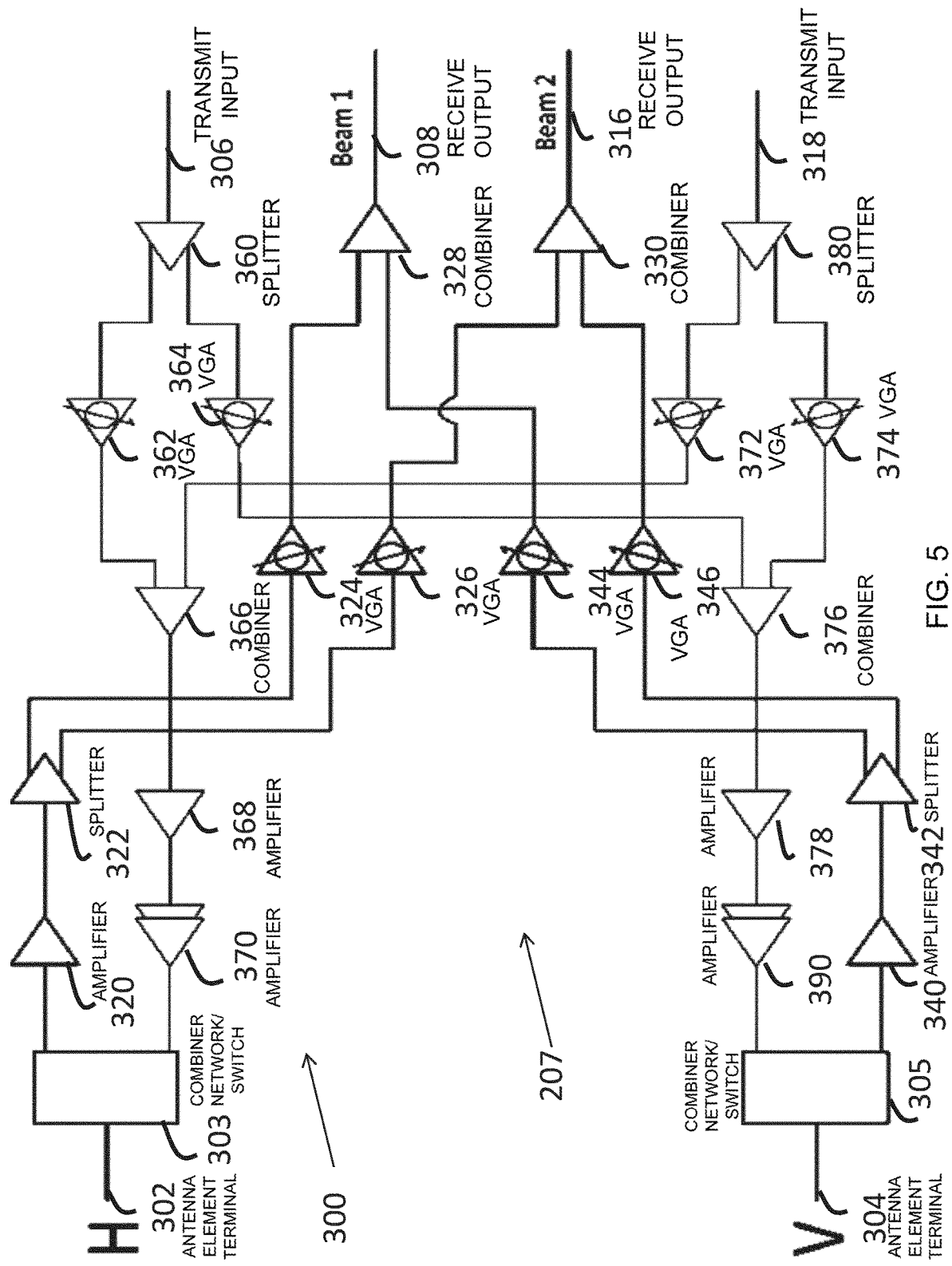
FIG. 5 is a schematic block diagram of the portion of the beam former integrated circuit illustrated in FIG. 4 in a satcom mode according to some embodiments.

With reference to FIG. 5, the portion 300 is configured in a satcom mode which provides arbitrary polarization with dual output beams (received from the antenna 104 (FIG. 3)). The portion 300 supports communication with different satellites simultaneously for double bandwidth or for performing make before break communications. The portion 300 is configured to have a first receive path from the combiner network 303 through the amplifier 320 and the splitter 322 to a first branch including the VGA 324 and the combiner 328 to the beam 1 receive output 308 and to a second branch including the VGA 326 and the combiner 330 to the beam 2 output 316. The portion 300 is also configured to have a second receive path from the combiner network 305 through the amplifier 340 and the splitter 342 to a first branch including the VGA 344 and the combiner 328 to the beam 1 receive output 308 and to a second branch including the VGA 346 and the combiner 330 to the beam 2 receive output 316. The configuration of portion 300 in FIG. 5 can be provided in a low power mode. The components outside of the first and second receive paths are powered off in some embodiments.

Figure 6:
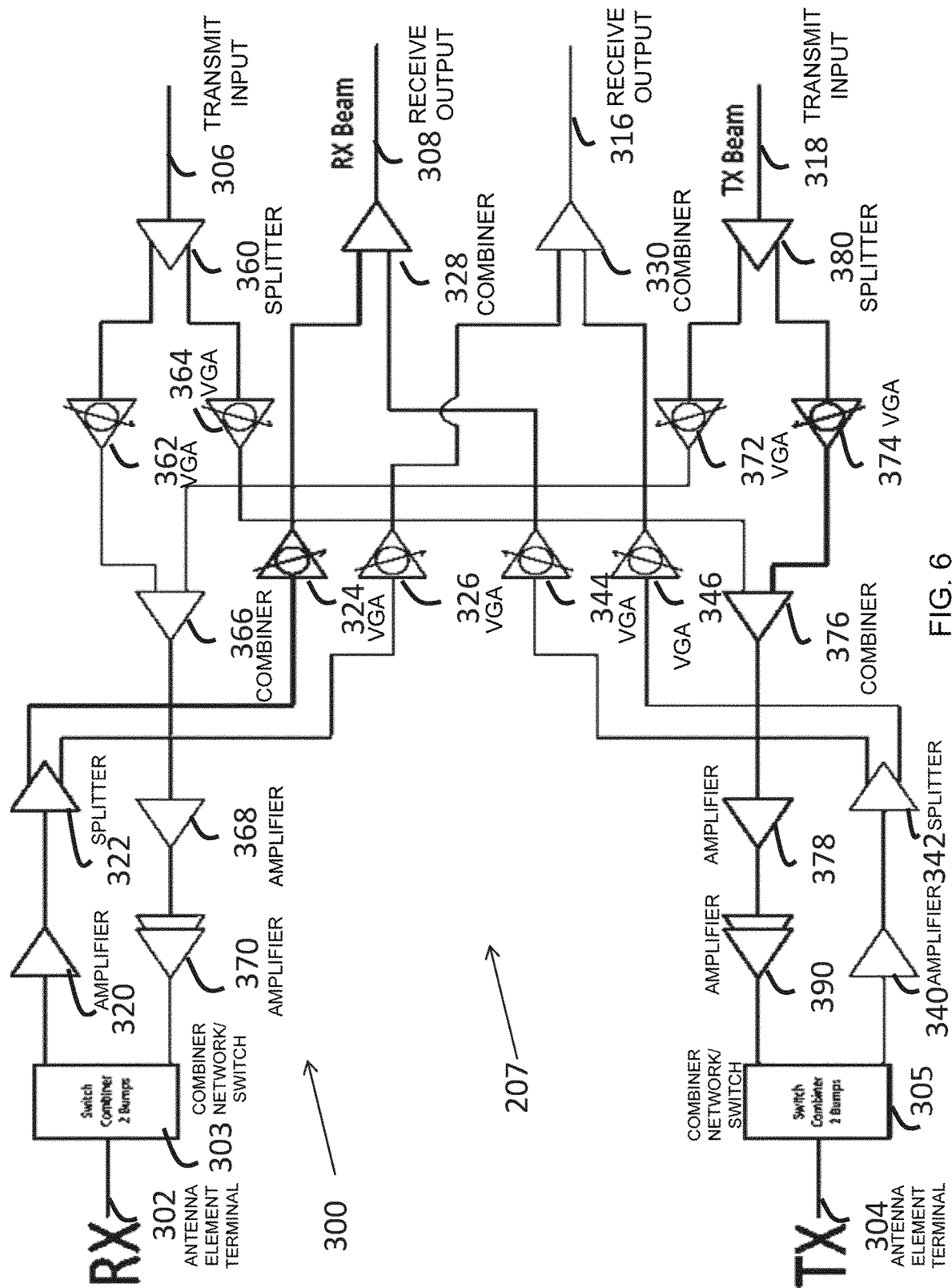
FIG. 6 is a schematic block diagram of the portion of the beam former integrated circuit illustrated in FIG. 4 in a radar mode according to some embodiments, according to some embodiments.

With reference to FIG. 6, the portion 300 is configured in a radar mode which provides a transmit signal to the antenna 104 (FIG. 3) and receives a receive a radar return signal from the antenna 104. The portion 300 is configured to have a receive path from the combiner network 303 through the amplifier 320 and the splitter 322 to the VGA 324 and the combiner 328 to the beam 1 receive output 308. The portion 300 is also configured to have a transmit path from the beam 2 input 318 to the combiner network 305 through the splitter 380, the VGA 374, the combiner 376, the amplifier 378, and the amplifier 390. The configuration of portion 300 in FIG. 6 can be provided in a high power mode. The components outside of the transmit path and receive paths are powered off in some embodiments.

Figure 7:
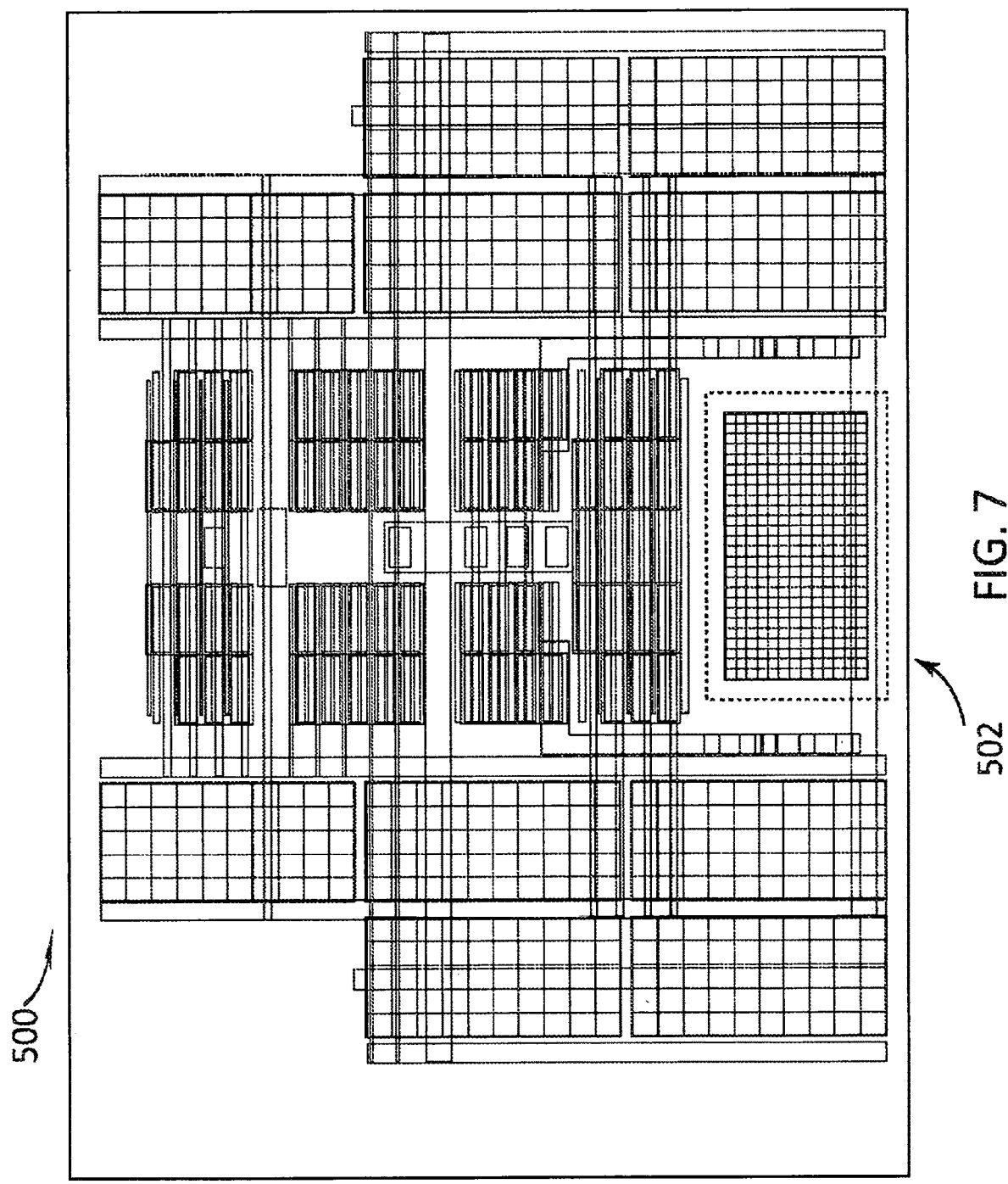
FIG. 7 is a schematic depiction of a layout for the beam former integrated circuit illustrated in FIG. 3 according to some embodiments.

With reference to FIG. 7, the integrated circuit 207 has a layout 500. Four portions 300 (FIG. 4) are provided on a portion 502 of the layout 500 which has a length dimension of 25 um. The layout is provided on a silicon germanium substrate in some embodiments.

Figure 8:
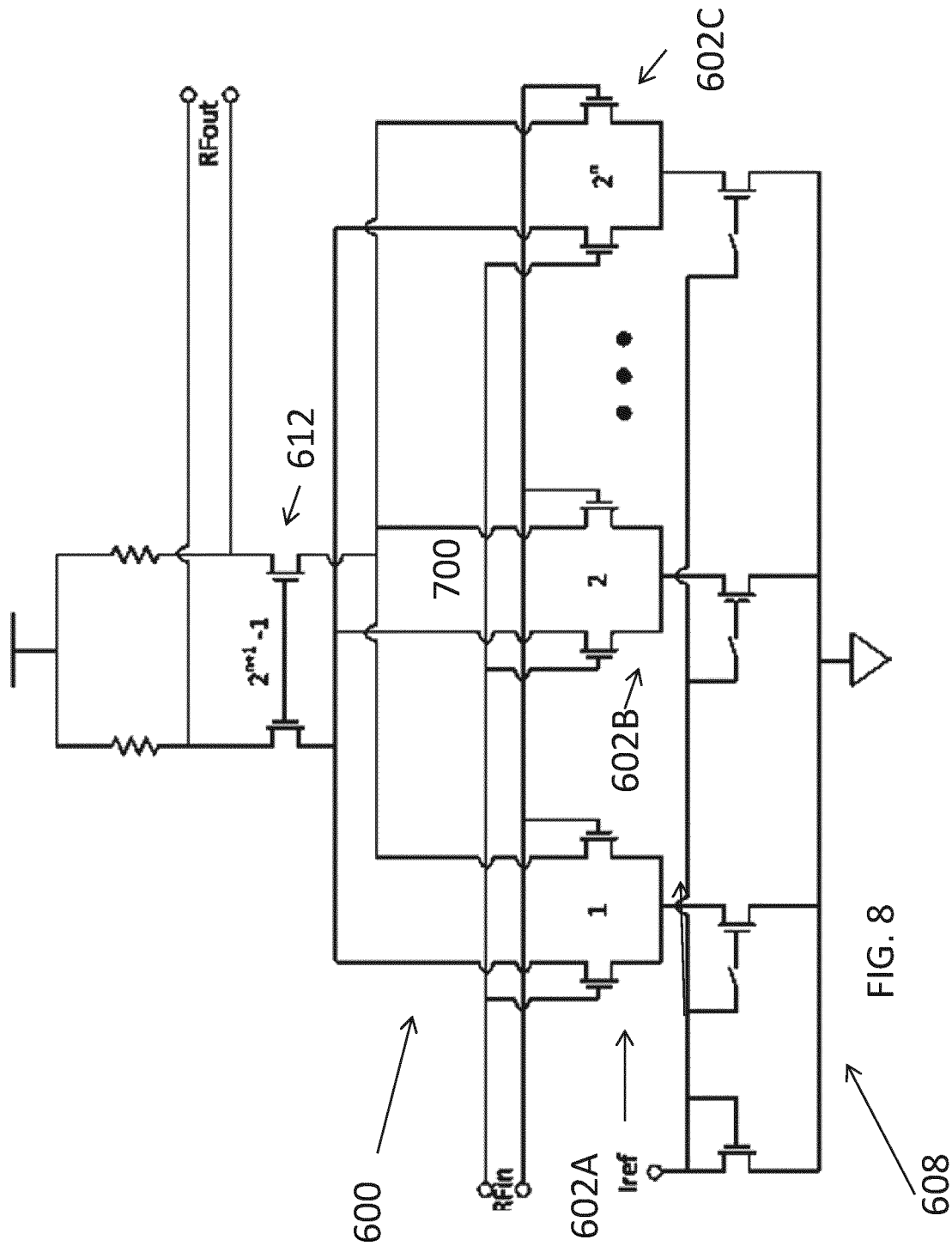
FIG. 8 is a an electrical schematic drawing of a modified current architecture for an amplifier in the beam former integrated circuit illustrated in FIG. 3 according to some embodiments.

With reference to FIG. 8, a modified current architecture 600 is provided for the active components in the portion 300. The modified current architecture 600 includes a set of current mirrors 602A-C (from 1 to N) which are selectable via the selection transistors 608. The current mirrors 602A-C each have different transistor areas so various current levels can be achieved. The ability to select current levels allows the portion 300 to have tunable linearity for different applications in some embodiments. The current levels are selected via the selection transistors 608. The number of stages or current mirrors shown in the modified current architecture 600 is exemplary.

Figure 9:
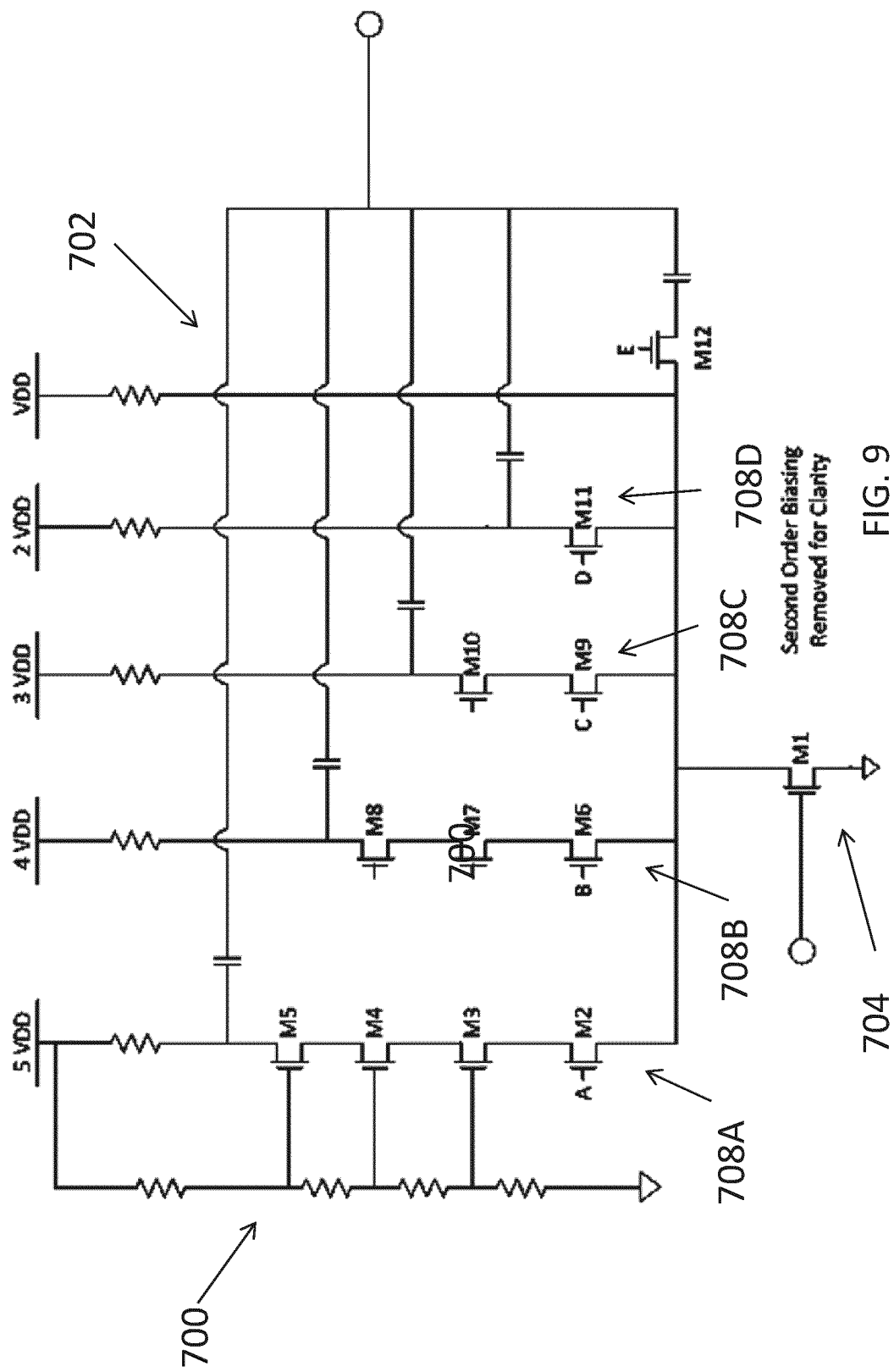
FIG. 9 is a an electrical schematic drawing of a voltage stacking architecture for an amplifier in the beam former integrated circuit illustrated in FIG. 3 according to some embodiments.

With reference to FIG. 9, a voltage stacking architecture 700 is provided for the active components in the portion 300. The voltage stacking architecture 700 is depicted in FIG. 9 as single ended for simplicity. The portion 300 utilizes a differential voltage stacking architecture in some embodiments. The voltage stacking architecture 700 includes a set 702 of branches (from 1 to N) which are selectable for different voltage levels (e.g., 5 VDC, 4 VDC, 3 VDC, 2 VDC, 1 VDC). Each of the branches in the set 702 702 includes sets 708A-D of buffer transistors (e.g., set 708A transistors M2-M5, set 708B—transistors M6-M8, set 708C—transistors M9-M10, and set 708 D—transistor M11). The current mirrors 620A-C together with current mirror 612 of the modified current architecture 600 (FIG. 8) is provided for the transistor 704 in the voltage stacking architecture 700. The selection transistors 608 of the modified current architecture 600 are provided for the transistor coupled to the transistor 704 in each of the sets 708A-D in the voltage stacking architecture 700. The voltage level is selected via the transistor coupled to the transistor 704 in each of the sets 708A-D in the voltage stacking architecture 700. The ability to select voltage levels allows the portion 300 to have tunable linearity for different applications in some embodiments. The number of stages or branches shown in the voltage stacking architecture 700 is exemplary.

The construction and arrangement of the systems and methods as shown in the various exemplary embodiments are illustrative only. For example, although specific configurations of the ESA system 102 are discussed, other configurations can be utilized. Although only a number of embodiments have been described in detail in this disclosure, many modifications are possible (e.g., variations in sizes, dimensions, structures, and proportions of the various elements, values of parameters, use of materials, orientations, etc.). For example, the correspondence of components to each other can be varied, the selected paths can be varied for different operational modes, and the nature or number of discrete elements or positions may be altered or varied. Accordingly, all such modifications are included within the scope of the inventive concepts disclosed herein. The order or sequence of any operational flow or method operations may be varied or re-sequenced according to alternative embodiments. Other substitutions, modifications, changes, and omissions may be made in the design, operating conditions and arrangement of the exemplary embodiments without departing from the scope of the inventive concepts disclosed herein.

What is claimed is:

1. A configurable integrated circuit for beamforming, comprising:
    a first beam transmit input;
    a first beam receive output;
    a second beam transmit input;
    a second beam receive output;
    a first antenna terminal;
    a second antenna terminal; and
    a first switch coupled to the first antenna terminal comprising:
        a first switch output coupled to a first output path, wherein the first output path comprises a first branch coupled to the first beam receive output and a second branch coupled to the second beam receive output; and
        a first switch input coupled to a first input path, wherein the first input path comprises a third branch coupled to the first beam transmit input and a fourth branch coupled to the second beam transmit input; and
    a second switch coupled to the second antenna terminal comprising:
        a second switch output coupled to a second output path, wherein the first input path comprises a fifth branch coupled to the first beam receive output and a sixth branch coupled to the second beam receive output; and
        a second switch input coupled to a second input path, wherein the first input path comprises a seventh branch coupled to the first beam transmit input and an eighth branch coupled to the second beam transmit input.

2. The configurable integrated circuit of claim 1, wherein the first beam transmit input, the first beam receive output, the second beam transmit input, the second beam receive output, the first antenna terminal, the second antenna terminal, the first switch, and
    the second switch are part of a first quadrant of the configurable integrated circuit.

3. The configurable integrated circuit of claim 2, wherein the first beam transmit input, the first beam receive output, the second beam transmit input, the second beam receive output, the first antenna terminal, the second antenna terminal, the first switch, and
    the second switch are repeatable portions of the integrated circuit.

4. The configurable integrated circuit of claim 1, wherein one of the first switch input or the first switch output are selectively coupled to the first switch input/output and one of the second switch input or the second switch output are selectively coupled to the second switch input/output.

5. The configurable integrated circuit of claim 1, wherein one of the first branch and the fifth branch are selectively coupled to the first beam receive output and one of the second branch and the sixth branch are selectively coupled to the second beam receive output.

6. The configurable integrated circuit of claim 1, wherein one of the first switch input or the first switch output are selectively coupled to the first switch input/output, wherein one of the second switch input or the second switch output are selectively coupled to the second switch input/output, wherein one of the first branch and the fifth branch are selectively coupled to the first beam receive output and one of the second branch and the sixth branch are selectively coupled to the second beam receive output.

7. The configurable integrated circuit of claim 1, wherein the first antenna terminal is coupled to a horizontal polarization element and the second antenna terminal is coupled to a vertical polarization element, wherein the first beam receive output is coupled to the first branch and the fifth branch via a first two input splitter; and
    wherein the second beam receive output is coupled to the second branch and the sixth branch via a second two input splitter.

8. The configurable integrated circuit of claim 1, wherein the first antenna terminal is coupled to a receive element and the second antenna terminal is coupled to a transmit element, wherein the first beam receive output is coupled to the first branch and the fifth branch via a first two input splitter; and
    wherein the second beam transmit input is coupled to the eighth branch via a second two input splitter.

9. The configurable integrated circuit of claim 1, wherein the first, second, third, fourth, fifth, sixth, seventh, and eighth branch each include a variable gain amplifier.

10. A beam former circuit, comprising:
    an integrated circuit comprising:
        a first beam transmit input;
        a first beam receive output;
        a second beam transmit input;
        a second beam receive output;
        a first antenna terminal;
        a second antenna terminal; and
        a configurable amplifier circuit comprising a first input/output selectively coupled to a first variable gain amplifier coupled to the first beam receive output and a second variable gain amplifier coupled to the second beam receive output, and the first input/output being selectively coupled to a third variable gain amplifier coupled to the first beam transmit input and a fourth variable gain amplifier coupled to the second beam transmit input; and
    wherein the configurable amplifier circuit further comprises a second input/output selectively coupled to a fifth variable gain amplifier coupled to the first beam receive output and a sixth variable gain amplifier coupled to the second beam receive output, and the second input/output being selectively coupled to a seventh variable gain amplifier coupled to the first beam transmit input and an eighth variable gain amplifier coupled to the second beam transmit input.

11. The beam former circuit of claim 10, wherein the first variable gain amplifier has a modified current architecture.

12. The beam former circuit of claim 10, wherein the first variable gain amplifier has a voltage stacking architecture.

13. The beam former circuit of claim 10, wherein the first variable gain amplifier has a modified current architecture and a voltage stacking architecture.

14. The beam former circuit of claim 10, wherein the first variable gain amplifier has a modified current architecture comprising a set of current mirrors comprising transistors of different sizes.

15. The beam former circuit of claim 10, wherein the first variable gain amplifier has a modified current architecture comprising a set of current mirrors comprising transistors of different sizes and disposed at a periphery of the integrated circuit.

16. A method of forming a beam, comprising:
    configuring an integrated circuit for operation in a satcom mode or a radar mode, wherein the integrated circuit comprises:

a first beam transmit input;
a first beam receive output;
a second beam transmit input;
a second beam receive output;
a first antenna terminal;
a second antenna terminal; and
an amplifier circuit;
wherein in the satcom mode, the amplifier circuit provides a first path from the first antenna terminal to the first beam receive output and a second path from the first antenna terminal to second beam receive output, wherein in the radar mode, the amplifier circuit provides a third path from the first antenna terminal to the first beam receive output and a fourth path from the second antenna terminal to the second beam transmit input; and
amplifying a first signal in the first path and a second signal in the second path in the satcom mode or amplifying a third signal in the third path and a fourth signal in the fourth path in the radar mode.

17. The method of claim 16, wherein amplifying step uses a voltage stacking architecture in at least one amplifier.

18. The method of claim 16, wherein amplifying step uses a modified current architecture in at least one amplifier in the amplifier circuit.

19. The method of claim 16, wherein the amplifier circuit comprises a switchable splitter coupled to the first antenna terminal.

20. The method of claim 16, wherein the amplifier circuit comprises a plurality of variable gain amplifiers for polarization synthesis and beam shaping.

* * * * *